United States Patent

[11] 3,627,350

| [72] | Inventor | Denver F. Cross<br>3036 N. Arlington Pl., Portland, Oreg. 97217 |
|---|---|---|
| [21] | Appl. No. | 889,651 |
| [22] | Filed | Dec. 31, 1969 |
| [45] | Patented | Dec. 14, 1971 |

[54] BUMPER FLIP STEP
3 Claims, 5 Drawing Figs.

[52] U.S. Cl. .................................................. 280/166, 182/91
[51] Int. Cl. ..................................................... B60r 3/02
[50] Field of Search ........................................... 280/164, 166, 163; 182/91

[56] References Cited
UNITED STATES PATENTS

| 3,463,509 | 8/1969 | Schiffner | 280/166 |
| 1,193,466 | 8/1916 | Mealer | 280/166 |

*Primary Examiner*—Benjamin Hersh
*Assistant Examiner*—Robert R. Song
*Attorney*—Kolisch & Hartwell ABSTRACT: A retractable step for an automotive vehicle, the step comprising a horizontal plate forming a tread which is supported upon a pair of angle configurated brackets which are pivoted at one set of ends. The tread when retracted rests over the vehicle bumper, and the tread is movable to an operative lowered position where a person may conveniently step thereupon when entering or leaving the vehicle.

INVENTOR.
DENVER F. CROSS

BUMPER FLIP STEP

This invention relates generally to foldable steps.

A principal object of the present invention is to provide a bumper flip step that is particularly designed for securement to an automotive vehicle such as a truck, camper or trailer so that a person may conveniently ascend or descend from the vehicle respective to the ground.

Another object of the present invention is to provide a bumper flip step which is readily securable to the vehicle bumper and which when not in use, is readily foldable over the top of the bumper so as to be out of the way.

Still another object of the present invention is to provide a bumper flip step which has only two moving parts and which is quickly and easily installed.

Other objects of the present invention are to provide a bumper flip step which is simple in design, inexpensive to manufacture, rugged in construction, easy to use and efficient in operation.

These and other objects will be readily evident upon a study of the following specification and the accompanying drawing wherein.

Figure 1:
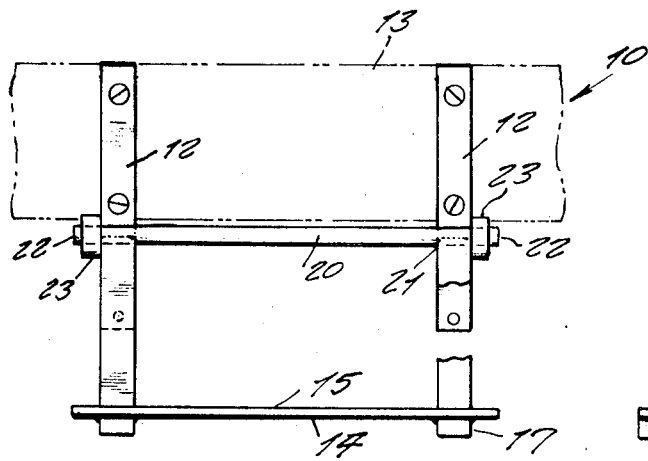
FIG. 1 is a front elevation view of the present invention shown in an extended operative position.
Figure 2:
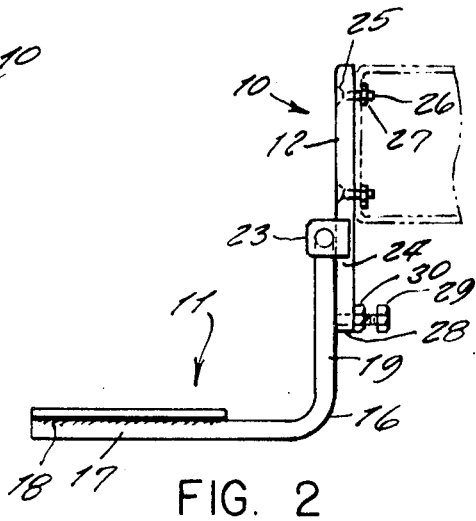
FIG. 2 is a side elevation view thereof.
Figure 3:
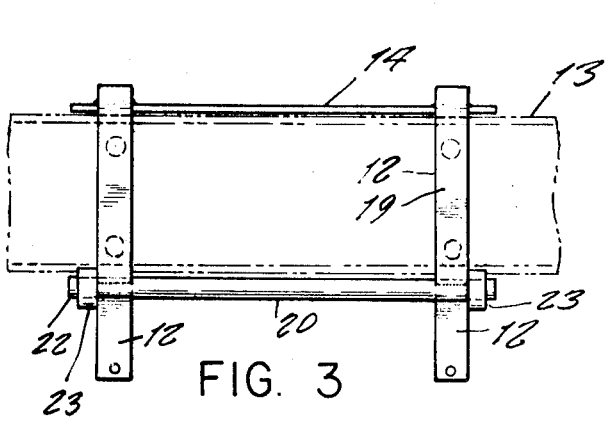
FIG. 3 is a front elevation view of the invention shown in a retracted position.
Figure 4:
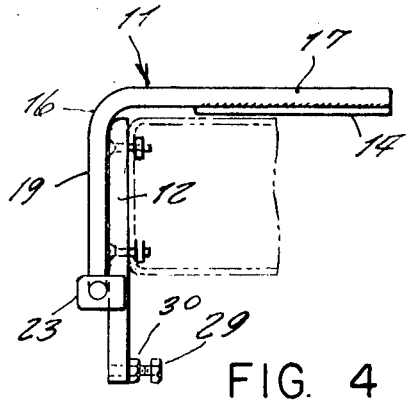
FIG. 4 is a side elevation view thereof.
Figure 5:
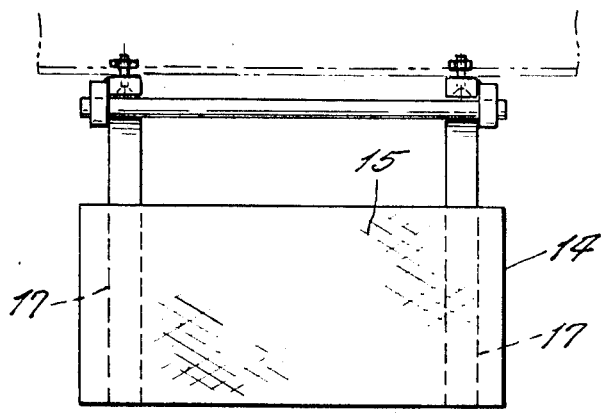
FIG. 5 is a plan view of the device when in an extended, operative position.

Referring now to the drawing in detail, the reference numeral 10 represents a bumper flip step assembly according to the present invention wherein there is a pivotable step assembly 11 which is pivotally attached to attaching plate means in the form of a pair of bars 12 that are securable to a bumper 13 of an automotive vehicle, such as a truck, camper, house trailer or other vehicle.

All of the components of the present invention are made preferably of a sturdy and strong metal that is relatively lightweight and which will retard corrosion upon exposure to the weather.

The portable step assembly 11 is comprised of a generally rectangular flat tread plate 14 which comprises a tread of the step and which is provided upon its upper side with a configurated tread pattern 15 serving as a grid pattern so that a person will not slip when placing his foot thereupon.

A pair of angle configurated brackets 16 are each provided with one leg 17 (referred to as a mounting leg) that is attached by means of a weld 18 to the under side of the plate 14, the legs 17 being parallel to each other, each of the brackets having another leg (referred to as a supporting leg) 19 perpendicular to the leg 17, the legs 19 being spaced apart and likewise parallel to each other.

Between the terminal ends of the legs 19, a cylindrical bar 20 is secured by means of a weld 21, the opposite ends 22 of the bar 20 projecting beyond the legs 19. These projecting ends are relatively rotatably supported within bearing blocks 23.

Each of the bearing blocks 23 is secured by means of a weld 24 or the like, along side an intermediate portion of one of the bars 12 that is attachable to the vehicle bumper 13.

The bars 12 are each provided with a pair of countersunk openings 25 for purpose of receiving mounting screws 26 that are receivable through the bumper front wall, the screws 26 being then secured by means of nuts 27 on a rear side of the bumper.

The lower end 28 of each bar has a bolt 29 attached therethrough, the bolt being adaptable to engage an intermediate portion of the leg 19 of a bracket 16.

A locknut 30 is carried on the bolt 29 so as to lock the bolt in a selected position. Thus the end of the bolt serves as a stop for the extended movement of the pivotable step assembly.

In operative use now, the pivotable step assembly can be easily and quickly pivoted between a retracted position and an extended position so that a person may conveniently descend or ascend the vehicle. When retracted, the device does not in any way interfere by projecting beyond the normal confines of the bumper.

It will be noted that journal bar 20 and bearing blocks 23 constitute journal means journaling extremities of the supporting legs to the attaching plate structure, i.e., the attaching bars 12. This journal means affords 180° swinging of the support legs, between a position where the legs extend vertically downwardly from the journal means and hold the step plate horizontal and projecting out from the front of the attaching plate structure or bars 12, and a position extending vertically upwardly along the front of the attaching plate structure with the step plate held over the top margin of the attaching plate structure and projecting horizontally over the back of the attaching plate structure and the bumper.

What I now claim is:

1. In a bumper flip step, the combination of a pivotable step assembly, attaching means attachable to the bumper of a vehicle, and means mounting the step assembly on said attaching means;

said attaching means comprising attaching plate structure adapted to be connected in a substantially upright plane to the side of a bumper with the back thereof against the bumper;

said step assembly comprising a pair of H-shaped brackets, each comprising a mounting leg and a supporting leg rigid with and normal to the mounting leg, said brackets being disposed at opposite sides of the assembly, said supporting legs being connected to said attaching plate structure in tandem relation, and a step plate spanning and connected to said mounting legs;

said means mounting the step assembly on said attaching plate structure comprising journal means journaling the free extremities of said supporting legs to said attaching plate structure at a location spaced below the top margin of said plate structure, said journal means affording 180° swinging of the supporting legs between a lowered position for the assembly where the supporting legs extend vertically downwardly from the journal means along the front of the plate structure and hold the step plate substantially horizontal and projecting out from the front of the plate structure, and a raised position for the assembly where the supporting legs extend vertically upwardly along the front of the attaching plate structure and hold the step plate over the top margin of the attaching plate structure and projecting horizontally to the back of said attaching plate structure, said attaching plate structure forming stop means for preventing said supporting legs from swinging beyond said lowered and raised position.

2. The combination of claim 1 wherein said journal means comprises a bar extending across and joining the extremities of said supporting legs having cylindrical ends projecting beyond said brackets, and bearing blocks joined to the attaching plate structure projecting out to the front thereof journaling said cylindrical ends of said bar.

3. The combination of claim 1 wherein said attaching plate structure comprises a pair of coplanar attaching bars adapted to be connected to the bumper of a vehicle, and wherein said journal means comprises a journal bar extending between and connected to the extremities of said supporting legs and a bearing block joined to each attaching bar at a location intermediate its ends, the bearing blocks of the two attaching bars journaling the journal bar adjacent its opposite extremities, at least one bar being in alignment with a supporting leg with the step assembly in its lowered position, and an adjustable stop mounted on said lower end of said one bar for engaging the supporting leg aligned therewith to define a lowered position for the assembly.

* * * * *

UNITED STATES PATENT OFFICE
CERTIFICATE OF CORRECTION

Patent No. 3,627,350  Dated December 14, 1971

Inventor(s) Denver F. Cross

It is certified that error appears in the above-identified patent and that said Letters Patent are hereby corrected as shown below:

Column 2, line 28, "H-shaped" should read -- L-shaped -- .

Signed and sealed this 14th day of November 1972.

(SEAL)
Attest:

EDWARD M. FLETCHER, JR.
Attesting Officer

ROBERT GOTTSCHALK
Commissioner of Patents